Sept. 23, 1924.

H. C. MUMMERT

WING RADIATOR FASTENING

Filed Oct. 12, 1923

INVENTOR
HARVEY C. MUMMERT.
BY
ATTORNEY.

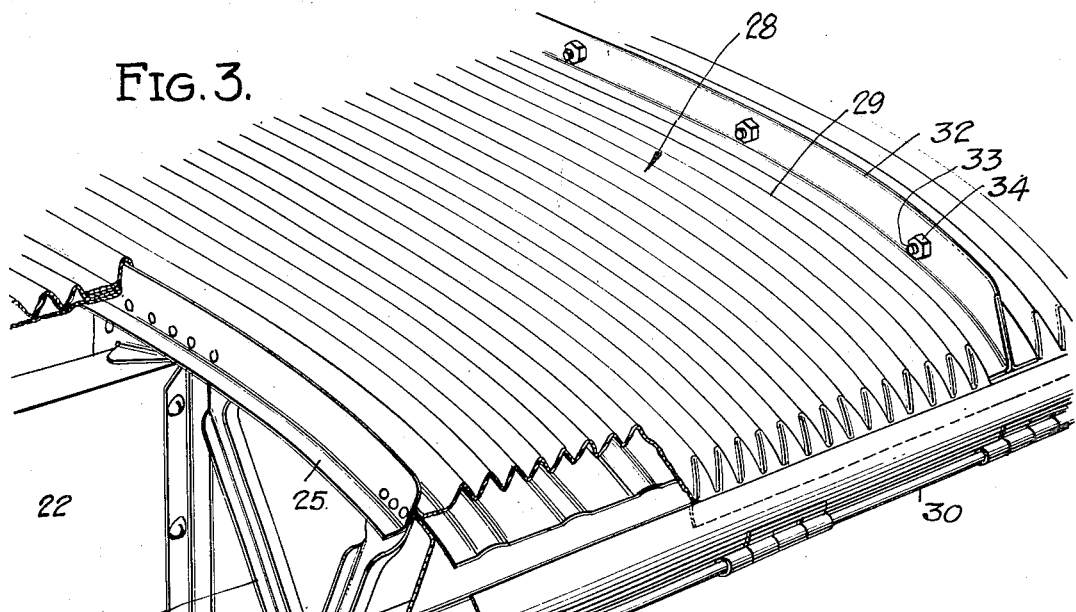
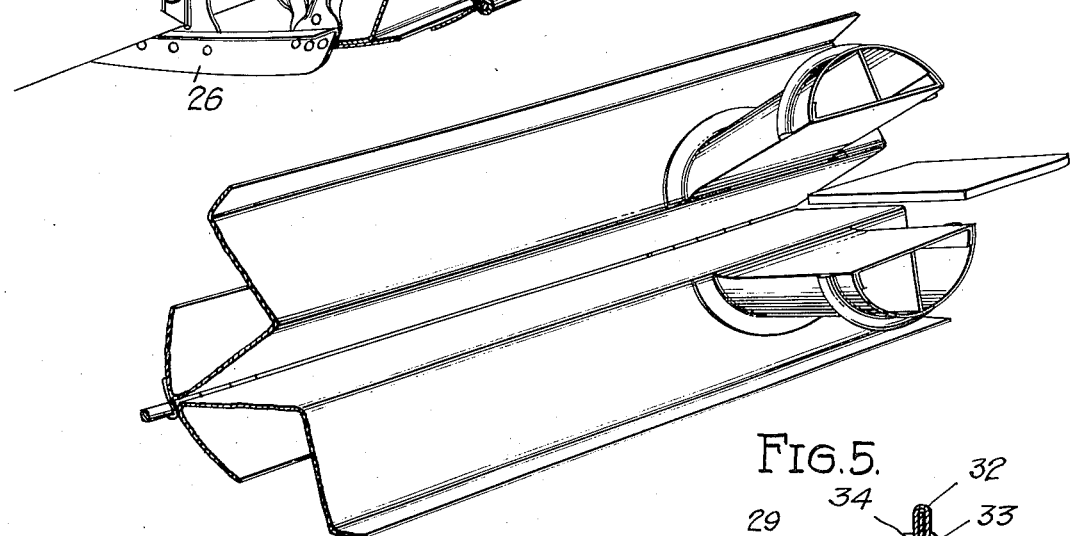
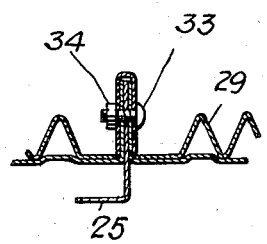
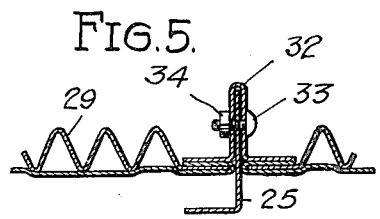

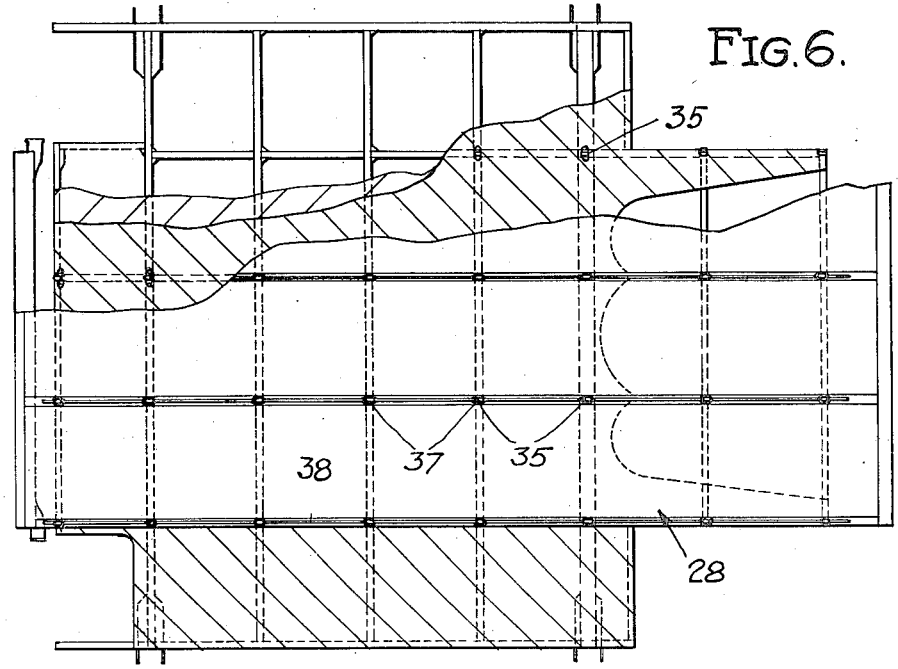
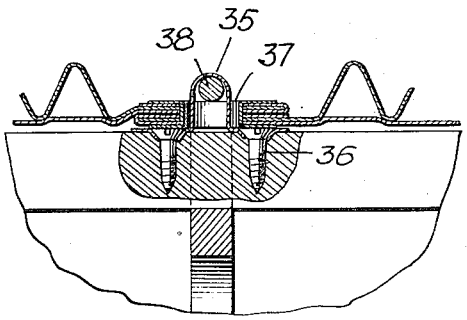
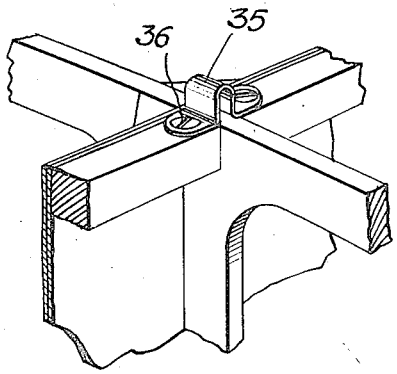
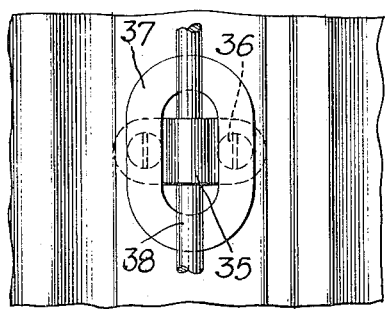

Patented Sept. 23, 1924.

1,509,251

UNITED STATES PATENT OFFICE.

HARVEY C. MUMMERT, OF HOLLIS, NEW YORK, ASSIGNOR, BY MESNE ASSIGNMENTS, TO CURTISS AEROPLANE AND MOTOR COMPANY, INC., OF GARDEN CITY, NEW YORK, A CORPORATION OF NEW YORK.

WING-RADIATOR FASTENING.

Application filed October 12, 1923. Serial No. 668,235.

*To all whom it may concern:*

Be it known that I, HARVEY C. MUMMERT, a citizen of the United States, residing at Hollis, in the county of Queens and State of New York, have invented certain new and useful Improvements in Wing-Radiator Fastenings, of which the following is a specification.

My invention relates to radiators for power plants of automotive vehicles.

Until the "Curtiss" development of the wing or surface type radiator, only a fair measure of success had attained as a result of the repeated and persistent efforts of airplane designers to eliminate the very appreciable resistance of the then almost universally used core type radiator structure. Since then, however, and especially as regards highspeed airplanes, the old or core type radiator has been almost, if not wholly superseded by radiators of the skin or surface type, i. e. wing radiators or radiators which from an aerodynamical point of view admit of maximum airplane performance. Accordingly, with this latter type of radiator, the present invention is particularly concerned.

The object of the invention is to so construct and mount a skin or surface type radiator upon an airplane or other automotive vehicle that the whole or any given part thereof may, if desired, be removed from, repaired and replaced upon that particular part or portion of the airplane or vehicle over and upon which the radiator is placed; the means for fastening the radiator, in every instance, being wholly accessible, positive, and at the same time so organized and constructed as to add but little, if any, to the total resistance which the radiator, considered in its entirety, offers in actual flight.

A further object of the invention (broadly stated) is the use of means carried by and projecting out from that part or portion of the vehicle over and upon which the radiator is placed, which means, together with other and further means engaging therewith, and also with the radiator, is relied upon to fasten the radiator in fixed position or in place.

Still further objects of the invention will be hereinafter pointed out.

In the accompanying drawings:

Fig. 3 is a perspective view of the leading edge portion of the supporting surface showing in detail the construction of the radiator and its fastening.

Fig. 4 is a detail perspective view of one of the divided radiator headers.

Fig. 5 is a fragmentary sectional view of the radiator.

Fig. 6 is a plan view similar to Fig. 1, illustrating a modified form of fastening.

Fig. 7 is a fragmentary sectional view illustrating in detail said modified form of fastening.

Fig. 8 is a perspective view of a portion of the supporting surface framework illustrating a further detail of said fastening.

Fig. 9 is a plan view (enlarged) further illustrating a detail of the modified form of fastening, and Fig. 10 is a fragmentary sectional view, similar to Fig. 5, illustrating a further modification.

Figure 1:
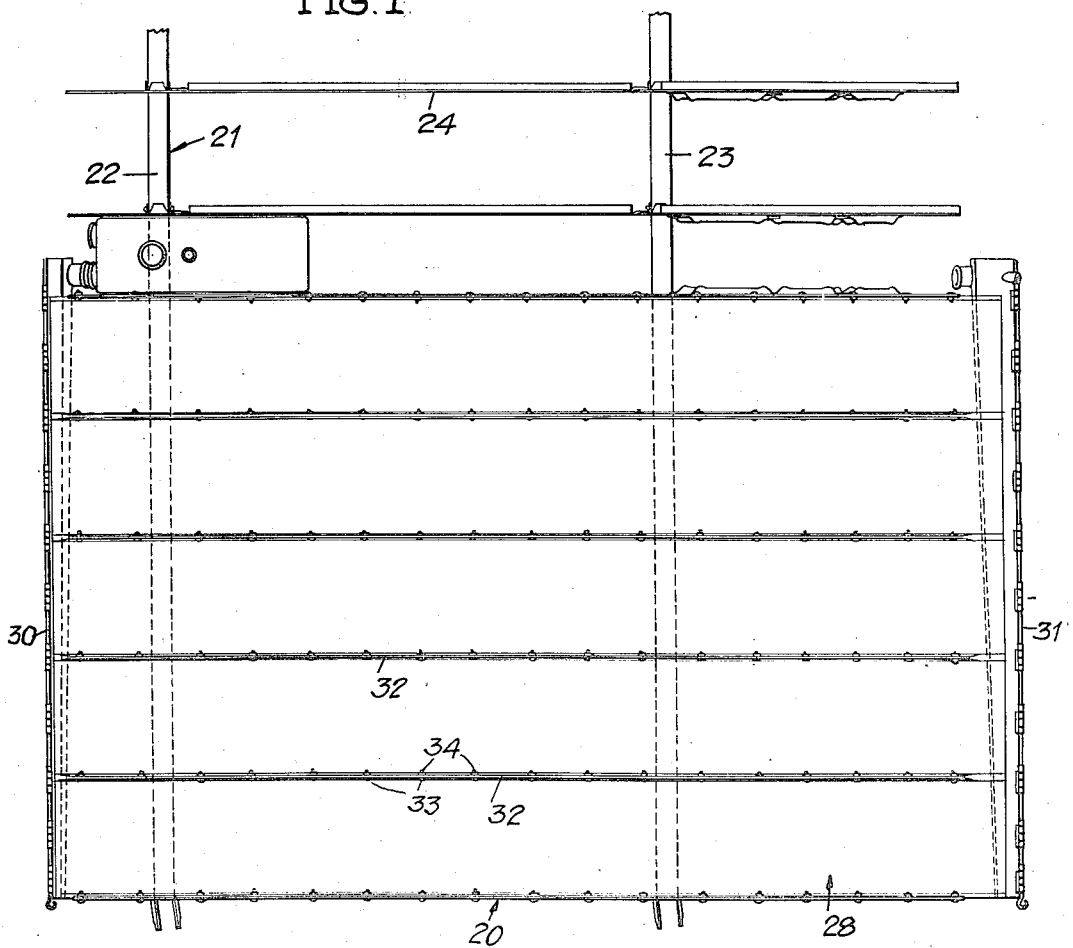
Fig. 1 is a plan view of a portion of an airplane supporting surface covered in part by the radiator structure herein disclosed.
Figure 2:
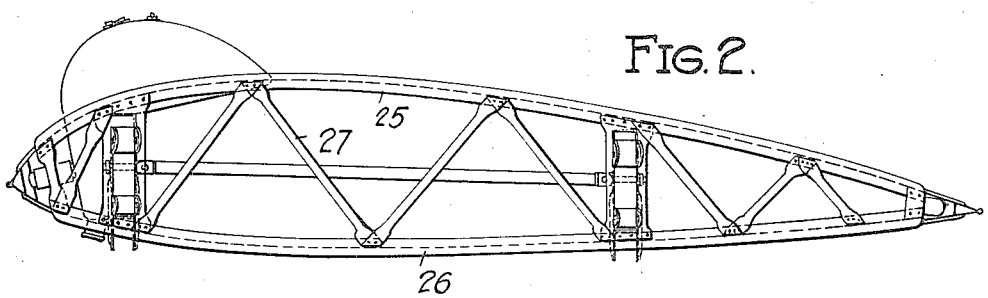
Fig. 2 is an end view of the supporting surface illustrated in Fig. 1.

As indicated, the invention finds adaptation to all forms of automotive vehicles, although in the embodiment selected for illustration the supporting surface of an airplane is shown as that part or portion of the vehicle over and upon which the skin or surface type radiator is placed. Said supporting surface, designated in its entirety as 20, comprises the usual skeleton framework 21, and outer veneer or fabric covering 22. The particular framework herein shown is of metal construction. Said framework includes a forward wing beam 22, a rear wing beam 23, and fore and aft metal ribs 24, the latter in turn comprising top and bottom chords 25 and 26 interconnected by channeled braces 27 at points calculated to best withstand the stresses set up in the wing structure during actual flight. Both the top and bottom chords 25 and 26 of the ribs 24, instead of being flush with the top and the bottom surface respectively of the wing, are extended outwardly or therebeyond in the form of a metal fore and aft strip. Such extended portions of the ribs 24 are best illustrated in Fig. 3.

The skin or surface type radiator, designated in its entirety as 28, is preferably made up of a plurality of radiator sections 29, said sections being similar in form and construction, and each comprising an inner and an outer metal corrugated sheet or strip so organized that the requisite number of water passages or cells are provided in the form of an outer covering for the wing. Since the details of construction of the radiator per se form no part of the present invention, a description thereof, in detail, will be omitted. Suffice it to say that the width of each radiator section 29 is preferably equal only to the spacing between the outstanding portions of the several wing ribs.

The radiator, in addition to being divided transversely of its length, is also divided at right angles thereto with a view to providing top and bottom radiator sections, said top and bottom sections, however, being in each instance made up of a plural number of sections such as are herein designated as 29. Said top and bottom radiator sections are hinged together at the leading and trailing edges respectively of the wing. The leading edge hinge pin is herein designated as 30, whereas the trailing edge hinge pin is herein designated as 31. Either or both hinge pins may be separately removed or withdrawn to the end that either radiator section may be bodily lifted out or removed from the supporting surface, it being understood, however, that the fastening means for the sections 29 (hereinafter described) shall have been first loosened and withdrawn.

The headers of the radiator, as in previous forms of radiators of this type, are disposed respectively at the leading and trailing edges of the wing. Each header is divided longitudinally of its length as indicated in Fig. 3, and the header sections are of a construction such that the flat faces thereof lie flat against each other. By thus dividing the headers the idea of constructing the radiator in halves, i. e. top and bottom sections, is wholly and completely carried out, since the hinge pins 30 and 31 lie contiguous to the dividing line of each header. In Fig. 4 the manner in which the header sections may be hingedly separated is clearly illustrated.

In the construction of the radiator sections 29, the metal plates thereof, being directly superimposed, are soldered or otherwise permanently fastened together and the edges of the respective sections bear directly against the outstanding portions 25 and 26 of the several wing ribs 24, thereby leaving narrow spaces or fore and aft slots between the sections, into and through which the outstanding portions of the said ribs extend. Over and upon the outer edges of said rib portions metal strips 32 are placed, each strip 32 being shaped as indicated in Fig. 5 to lie flat against the opposite faces of the outstanding rib portions as well as flat against adjacent radiator sections 29. The strips 32 being thus positioned are soldered in place throughout the length of the base flange of each strip, thus, in effect, producing an unbroken continuity of radiator. Through bolt holes formed in the outstanding rib portions as well as in the strips 32, bolts 33 are inserted, each bolt being provided with a lock nut 34. Thus fastened, obviously the fastening means is at all times accessible, may be conveniently removed, and is so constituted as to admit of a direct interconnection between the wing framework and the radiator without at any point necessitating the formation of an aperture in that part of the radiator through which the cooling agent flows.

Referring now to the modification illustrated in Figs. 6 to 9 inclusive, instead of extending the portions of the wing rib outwardly as hereinafter disclosed, grommets 35 are provided. These grommets 35 are permanently fastened to the framework of the wing as indicated at 36. Preferably they are placed in a fore and aft line coincident with the line of division between the sections comprising the radiator as a whole. Along such line of division the radiator sections are lapjointed and apertured as indicated at 37, each aperture being so formed as to register with and receive the grommets as the radiator is placed over the wing. Through the aligned grommets, and in direct contact with the outer surface of the radiator, lock pins 38 are inserted, the lock pins, thus positioned, being relied upon to provide the necessary fastening means for holding the radiator in place. Preferably (see Fig. 6) the lock pins extend in a fore and aft direction, a single pin being disposed parallel with and contiguous to the top edge and the bottom edge of each wing rib.

In the modification of Fig. 10, the metal plates comprising the radiator sections, instead of terminating flush with and in abutting contact with the outstanding portions of the wing ribs, are flanged or bent outwardly so as to bear against said rib portions on the opposite faces thereof. Thus extended, the fastening bolts 33 not only penetrate the outstanding rib portions, but in addition, penetrate the outwardly bent portions of the radiator sections 29.

From the foregoing, taken in connection with the accompanying drawings, it is apparent that a wing type radiator capable of being quickly removed, repaired and replaced has been produced. It is further apparent that the fastening means, though entirely exposed, offers but little, if any increased resistance to flight. Such advantages, while seemingly but slight, are of the utmost importance in that they render this much desired type of radiator a great deal more practical and desirable in view of the ease with which it can be removed after having been once firmly fastened in place.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

I claim:

1. A fastening for skin or surface type radiators comprising means carried by and projecting out from that part or portion of the vehicle over and upon which the radiator is placed, together with other and further means engaging said first mentioned means and also the radiator for fastening the radiator to said vehicle part.

2. A fastening for skin or surface type radiators comprising means fastened to and projecting out from that part or portion of the vehicle over and upon which the radiator is placed, together with other and further means let through openings formed in said first mentioned means for fastening the radiator in place.

3. A fastening for skin or surface type radiators comprising means fastened to and projecting out from that part or portion of the vehicle over and upon which the radiator is placed, the radiator at intervals of space being provided with open slots into which said means are adapted to extend, together with other and further means engaging said first mentioned means and also the radiator for fastening the radiator in place.

4. A fastening for skin or surface type radiators comprising means fastened to and projecting out from that part or portion of the vehicle over and upon which the radiator is placed, together with other and further means let through openings formed in said first mentioned means for fastening the radiator to said vehicle part.

5. A fastening for skin or surface type radiators comprising means fastened to and projecting out from that part or portion of the vehicle over and upon which the radiator is placed, said radiator being apertured to receive said outwardly projecting means, and said outwardly projecting means having formed therein openings through which other and further means is adapted to engage to fasten the radiator to said vehicle part.

6. A fastening for skin or surface type radiators including, in combination with a plurality of radiator sections, means carried by and projecting out from that part or portion of the vehicle over and upon which the radiator sections are placed, said outwardly projecting means being adapted to engage in openings formed in the radiator along lines coincident with the dividing line between the radiator sections, together with other and further means engaging said first mentioned means and also the radiator for fastening the radiator in place.

7. A fastening for skin or surface type radiators comprising, in combination with an aeroplane wing including in its structural frame work a rib, means carried by the wing and extending lengthwise the rib, said means being extended outwardly beyond the surface of the wing through apertures formed in the radiator, together with means engaging said first mentioned means and also the radiator for fastening the radiator in place.

8. The combination with an aeroplane wing and a skin or surface type radiator mounted thereon, said radiator comprising a top radiator section and a bottom section engaging respectively the top surface and under surface of said wing, of a fastening for said radiator comprising means carried by the wing and projecting outwardly therefrom through openings formed in the radiator, means engaging said radiator and said outwardly projecting means for fastening the radiator to the wing, and a hinge connection between the sections of the radiator disposed respectively along the leading and the trailing edges of the wing.

In testimony whereof I hereunto affix my signature.

HARVEY C. MUMMERT.